United States Patent
Ishizaki et al.

(10) Patent No.: US 12,373,384 B2
(45) Date of Patent: Jul. 29, 2025

(54) DATA FLOW CONTROL DEVICE, DATA FLOW CONTROL METHOD, AND DATA FLOW CONTROL PROGRAM

(71) Applicant: NIPPON TELEGRAPH AND TELEPHONE CORPORATION, Tokyo (JP)

(72) Inventors: Teruaki Ishizaki, Tokyo (JP); Sampath Priyankara, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 12 days.

(21) Appl. No.: 18/035,481

(22) PCT Filed: Nov. 10, 2020

(86) PCT No.: PCT/JP2020/041987
§ 371 (c)(1),
(2) Date: May 4, 2023

(87) PCT Pub. No.: WO2022/102001
PCT Pub. Date: May 19, 2022

(65) Prior Publication Data
US 2023/0334007 A1    Oct. 19, 2023

(51) Int. Cl.
G06F 15/82    (2006.01)
(52) U.S. Cl.
CPC ................... G06F 15/825 (2013.01)
(58) Field of Classification Search
CPC .................................................. G06F 15/825
See application file for complete search history.

(56) References Cited

U.S. PATENT DOCUMENTS

| | | | | |
|---|---|---|---|---|
| 7,664,938 | B1* | 2/2010 | Tripathi | G06F 9/3885 712/220 |
| 2004/0054869 | A1* | 3/2004 | Igarashi | G06F 9/3897 712/E9.035 |
| 2012/0126850 | A1* | 5/2012 | Wasson | G06F 9/3897 326/38 |
| 2019/0101952 | A1* | 4/2019 | Diamond | G06F 15/825 |
| 2019/0122415 | A1* | 4/2019 | S. | G06T 15/005 |
| 2020/0089503 | A1* | 3/2020 | Gupta | G06F 9/3804 |

FOREIGN PATENT DOCUMENTS

WO    2020115888 A1    6/2020

OTHER PUBLICATIONS

Cyber Agent, "Daikibo detashori (Large-scale data processing)" [online] Accessed on Oct. 6, 2020, website: https://www.cyberagent.co.jp/techinfo/labo/tech/detail/id=23934.

Fukuda et al. (2015) "Saibaegentonodetakatsuyounotameno R & D taisei totorikumi (R & D at CyberAgent for data utilization)", The Japanese Society for Artificial Intelligence, vol. 30, No. 3, pp. 318-324 [online] website: https://jsai.ixsq.nii.ac.jp/ej/?action=repository_action_common_download&item_id=1892&item_no=1&attribute_id=22&file_no=1.

* cited by examiner

Primary Examiner — Michael J Metzger

(57) ABSTRACT

A data flow control device includes processing circuitry configured to calculate, from among data flows obtained by commonizing and integrating at least a part of a first data flow in operation in a system that processes data and an input second data flow, a third data flow in which a resource use amount when operated in the system satisfies a predetermined condition, and instruct the system to switch the first data flow to the third data flow.

7 Claims, 5 Drawing Sheets

DATA FLOW CONTROL DEVICE, DATA FLOW CONTROL METHOD, AND DATA FLOW CONTROL PROGRAM

CROSS-REFERENCE TO RELATED APPLICATIONS

This application is a U.S. National Stage Application filed under 35 U.S.C. § 371 claiming priority to International Patent Application No. PCT/JP2020/041987, filed on 10 Nov. 2020, the disclosure of which is hereby incorporated herein by reference in its entirety.

TECHNICAL FIELD

The present invention relates to a data flow control device, a data flow control method, and a data flow control program.

BACKGROUND ART

Conventionally, a method called "Kafon" for managing functions related to data transfer by dividing the functions into a plurality of logical layers on the basis of metadata of a workflow for performing data processing has been known (see Non Patent Literature 1, for example).

In the method described in Non Patent Literature 1, functions of the system is managed by being divided into four layers of application logic, management of transfer path, transmission between nodes, and middleware implementation, and efficiency of data flow is improved by commonization of transfer processing, for example.

CITATION LIST

Non Patent Literature

Non Patent Literature 1: Cyber Agent, "Daikibo detashori (Large-scale data processing)", .cyberagent.co.jp/techinfo/labo/tech/detail/id=23934
Non Patent Literature 2: Ichiro Fukuda et al. "Saibaegentono detakatsuyounotameno R & D taisei to torikumi (R & D at CyberAgent for data utilization)", The Japanese Society for Artificial Intelligence, Vol. 30, No. 3, pp. 318-324. (jsai.ixsq.nii.ac.jp/ej/?action=repository_action_common_download&item_id=1892&ite m_no=1&attribute_id=22&file_no=1)

SUMMARY OF INVENTION

Technical Problem

However, the conventional method has a problem that it may be difficult to improve the efficiency of data flow in the entire system. For example, in the method described in Non Patent Literature 1, the capability of a computing unit to which a task is assigned, data transfer between computing units, and the like are not considered, and the performance is not necessarily improved in the entire system.

Solution to Problem

In order to solve the above-described problems and achieve the object, a data flow control device includes processing circuitry configured to: calculate, from among data flows obtained by commonizing and integrating at least a part of a first data flow in operation in a system that processes data and an input second data flow, a third data flow in which a resource use amount when operated in the system satisfies a predetermined condition; and instruct the system to switch the first data flow to the third data flow.

Advantageous Effects of Invention

According to the present invention, data flow can be made efficient in an entire system.

DESCRIPTION OF EMBODIMENTS

Hereinafter, an embodiment of a data flow control device, a data flow control method, and a data flow control program according to the present application will be described in detail with reference to the drawings. Note that the present invention is not limited to the embodiment described below.

Figure 1:
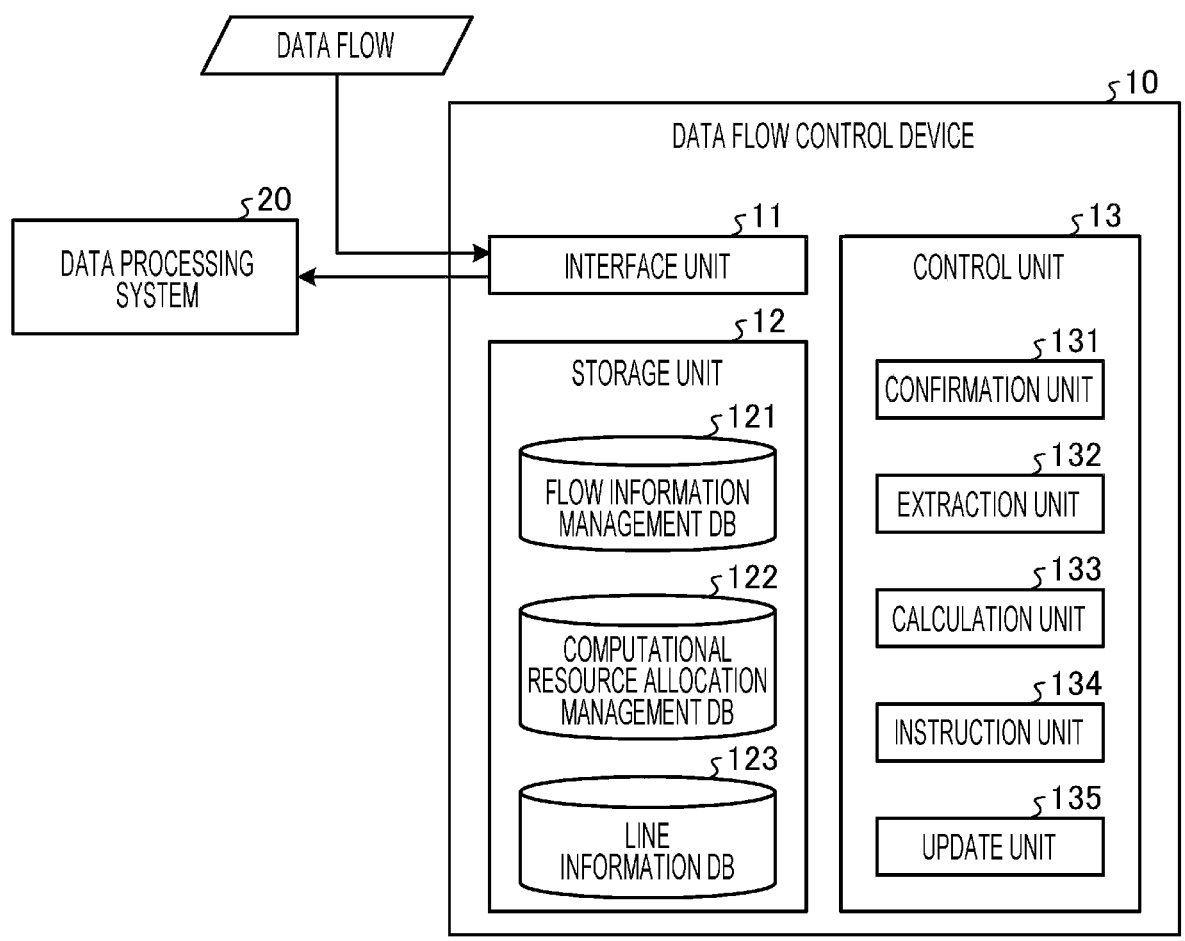
FIG. 1 is a diagram illustrating a configuration example of a data flow control device according to a first embodiment.

[Configuration of first embodiment] First, a configuration of a data flow control device according to a first embodiment will be described with reference to FIG. 1. FIG. 1 is a diagram illustrating an example of a configuration of the data flow control device according to the first embodiment.

As illustrated in FIG. 1, a data flow control device 10 accepts input of a data flow and outputs a data flow change instruction to a data processing system 20. The user inputs data flow definition information for adding, updating, deleting, or the like of a data flow to the data flow control device 10. The data flow control device 10 has an interface unit 11, a storage unit 12, and a control unit 13. Note that the data processing system 20 is an example of a system that processes data.

The interface unit 11 is an interface for inputting/outputting data and communicating data. For example, the interface unit 11 accepts input of data from an input device such as a keyboard and a mouse. Moreover, for example, the interface unit 11 outputs data to an output device such as a display and a speaker. Moreover, for example, the interface unit 11 may be a network interface card (NIC).

The storage unit 12 is a storage device such as a hard disk drive (HDD), a solid state drive (SSD), or an optical disk. Note that the storage unit 12 may be a data-rewritable semiconductor memory such as a random access memory (RAM), a flash memory, or a non volatile static random access memory (NVSRAM). The storage unit 12 stores an operating system (OS) and various programs to be executed by the data flow control device 10. Moreover, the storage unit 12 stores a flow information management DB 121, a computational resource allocation management DB 122, and a line information DB 123.

The flow information management DB 121 holds information on a data flow in operation in the data processing system 20. The flow information management DB 121 holds a data acquisition source, a processing method, a processing order, and the like of each processing included in the data flow. Moreover, the flow information management DB 121 holds various kinds of metadata regarding data collected by the data processing system 20 and the attribute of the user of the data flow.

The computational resource allocation management DB 122 holds information such as executable processing and whether or not allocation to each processing is performed for each calculation resource. Furthermore, the computational resource allocation management DB 122 holds information on whether or not allocation of a calculation resource to each user is permitted, that is, information on access control.

The line information DB 123 holds information on network delays and bands between servers, between users and servers, between data collection sources and servers, and between data centers. Note that the server here is, for example, a plurality of servers included in the data processing system 20.

The control unit 13 controls the entire data flow control device 10. The control unit 13 is, for example, an electronic circuit such as a central processing unit (CPU), a micro processing unit (MPU), or a graphics processing unit (GPU), or an integrated circuit such as an application specific integrated circuit (ASIC) or a field programmable gate array (FPGA). Moreover, the control unit 13 has an internal memory for storing programs and control data defining various processing procedures, and executes each processing using the internal memory. Moreover, the control unit 13 functions as various processing units by operation of various programs. For example, the control unit 13 includes a confirmation unit 131, an extraction unit 132, a calculation unit 133, an instruction unit 134, and an update unit 135.

The confirmation unit 131 refers to the flow information management DB 121 and confirms whether or not attribute information of a user corresponding to an input data flow permits sharing of the data flow. Furthermore, the confirmation unit 131 confirms whether or not there is an overlapping part between the input data flow and a data flow in operation.

For example, in a case where the flow information management DB 121 indicates that a resource such as a computing unit and a network resource are used by a data flow owned by a user having authority of priority use, the resource is occupied by the user. Therefore, the confirmation unit 131 determines that integration of the data flow owned by the user having the authority of priority use and the input data flow is not permitted.

Figure 2:
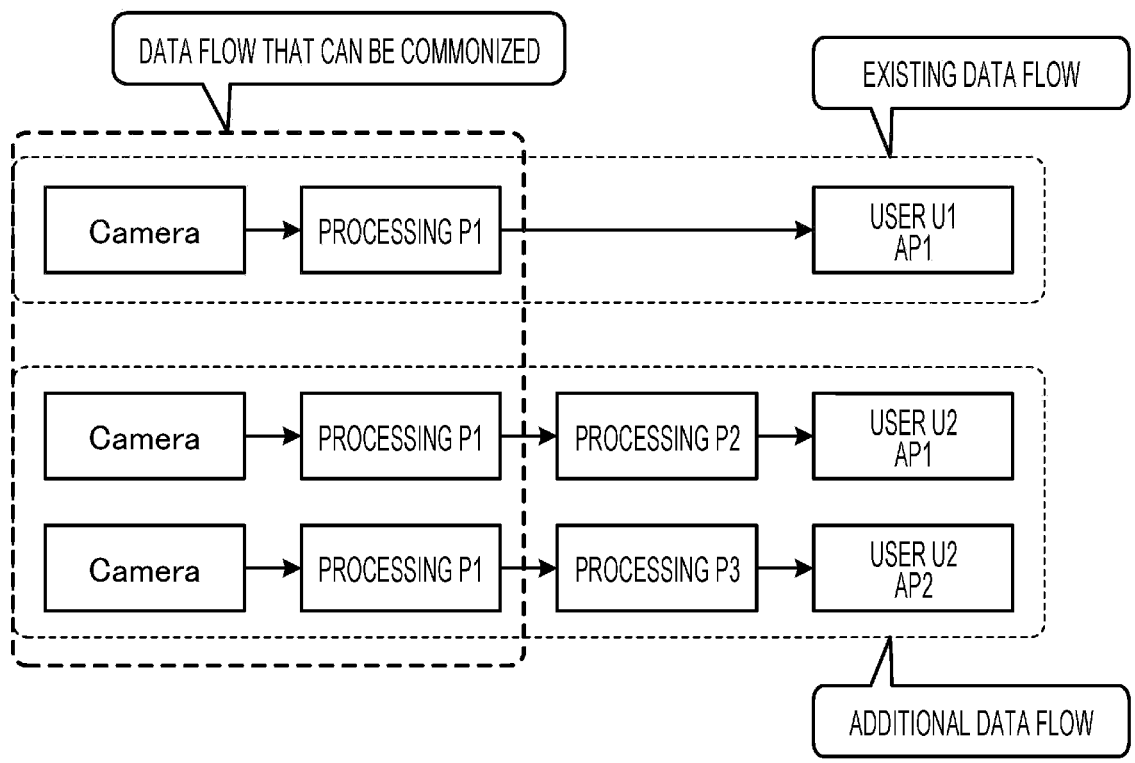
FIG. 2 is a schematic diagram illustrating an example of a data flow.

Here, a data flow will be described with reference to FIG. 2. FIG. 2 is a schematic diagram illustrating an example of a data flow. An existing data flow in FIG. 2 is a data flow in operation in the data processing system 20. Moreover, an additional data flow is a data flow input into the data flow control device 10 by the user.

As illustrated in FIG. 2, the existing data flow and the additional data flow overlap each other at a part "Camera→processing P1". Therefore, in the example of FIG. 2, the confirmation unit 131 confirms that there is an overlapping part between the input data flow and the data flow in operation.

The extraction unit 132 extracts a shareable data flow from the existing data flow. For example, the extraction unit 132 extracts a data flow that is permitted to be shared by attribute information of the user and has an overlapping part.

The calculation unit 133 calculates, from among data flows obtained by commonizing and integrating at least a part of the data flow extracted by the extraction unit 132 and the input data flow, a new data flow in which a resource use amount when operated in the data processing system 20 satisfies a predetermined condition.

Here, the data flow extracted by the extraction unit 132 is an example of a first data flow in operation in a system that processes data. The input data flow is an example of a second data flow. The new data flow is an example of a third data flow.

First, the calculation unit 133 creates a combination of a vacant calculation resource and a network resource capable of implementing each data flow for each data flow extracted by the extraction unit 132. At this time, the calculation unit 133 can create a combination with reference to the computational resource allocation management DB 122 and the line information DB 123.

Furthermore, the calculation unit 133 calculates the resource use amount, that is, the cost for each created combination, and selects, for example, a combination with the lowest cost. The calculation unit 133 calculates the cost on the basis of the data transfer delay time between computational resources of each combination, the data providing source and the computational resource, and the data output destination and the computational resource, and network NW band information.

A computational resource is, for example, a computing device of an information processing device included in the data processing system 20. A data providing source is, for example, a camera, a sensor, or the like. A data output destination is, for example, another information processing device and an output device such as a display.

Moreover, as described above, the confirmation unit 131 confirms whether or not commonization of the data flow in operation is permitted on the basis of attribute information set in advance for the user of the data flow in operation. Then, when the confirmation unit 131 confirms that commonization of the data flow in operation is permitted, the calculation unit 133 calculates the commonized data flow.

The instruction unit 134 instructs the system to switch the data flow extracted by the extraction unit 132 to the new data flow calculated by the calculation unit 133.

Figure 3:
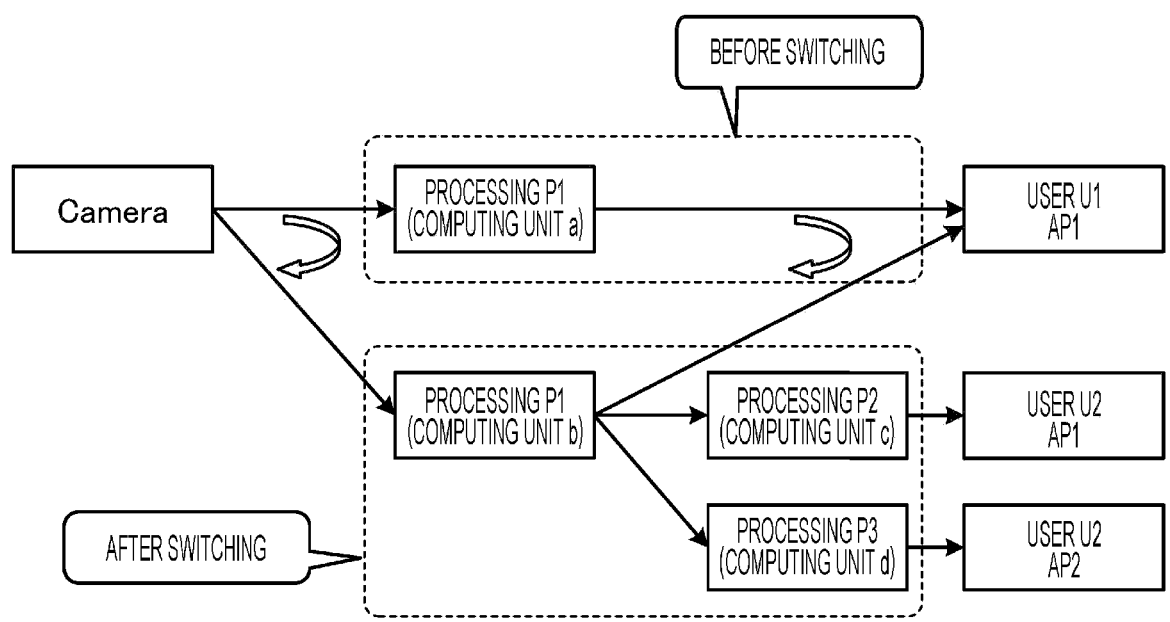
FIG. 3 is a diagram for describing switching of data flows.

FIG. 3 is a diagram for describing switching of data flows. As illustrated in FIG. 3, in a data flow before switching, when a user U1 executes an application AP1, processing P1 is executed by a computing unit a.

Here, assume that data flows regarding execution of the application AP1 by a user U2 and execution of the application AP1 by the user U2 are added. In the data flow before switching and the added two data flows, a part for executing the processing P1 overlaps. Therefore, the calculation unit 133 calculates a data flow "Camera→processing P1 (computing unit b)→user U1 AP1" obtained by integrating the data flow before switching and the added data flow.

Then, when the data flow "Camera→processing P1 (computing unit b)—user U1 AP1" is selected by the calculation unit 133, the instruction unit 134 instructs the data processing system 20 to switch the existing data flow "Camera→processing P1 (computing unit a)→user U1 AP1" to the selected data flow "Camera→processing P1 (computing unit b)→user U1 AP1".

Before and after the switching, the computing unit that executes the processing P1 changes. For example, the computing unit b stores the execution result of the processing P1 in a queue provided between processing P2 and processing P3.

In this manner, the calculation unit 133 can store the result of the processing P1 common to the existing data flow and the input data flow in a queue, and calculate an integrated data flow in which the processing P2 and the processing P3 using the result of the processing P1 in the input data flow acquire data from the queue. In other words, a computing unit c and a computing unit d acquire the execution result of the processing P1 from the queue in the process of executing the processing P2 and the processing P3, respectively.

In this case, the data processing system 20 can acquire the execution result from the queue without executing the processing P1 when executing the processing P2 and the processing P3. Note that the execution result of the processing P1 is, for example, a list of data obtained by a search.

Note that in a case where the calculation unit 133 determines that the overall cost increases as a result of changing the execution subject of the processing P1 from the computing unit a to the computing unit b, it is possible to not select the switching of the data flow as illustrated in FIG. 3.

The update unit 135 updates the information of each DB in accordance with the switching between the new and old data flows. Here, the data flow before switching is referred to as an old data flow. The data flow after switching is referred to as a new data flow.

First, the update unit 135 secures a calculation resource for the new data flow and updates the computational resource allocation management DB 122 before switching the new and old data flows. Then, after switching between the new and old data flows, the update unit 135 adds information of the new data flow to the flow information management DB 121 and updates information of the old data flow.

Then, the update unit 135 releases the calculation resource used in the old data flow and updates the computational resource allocation management DB 122. Furthermore, the update unit 135 updates the flow information management DB 121 of the old data flow.

Figure 4:
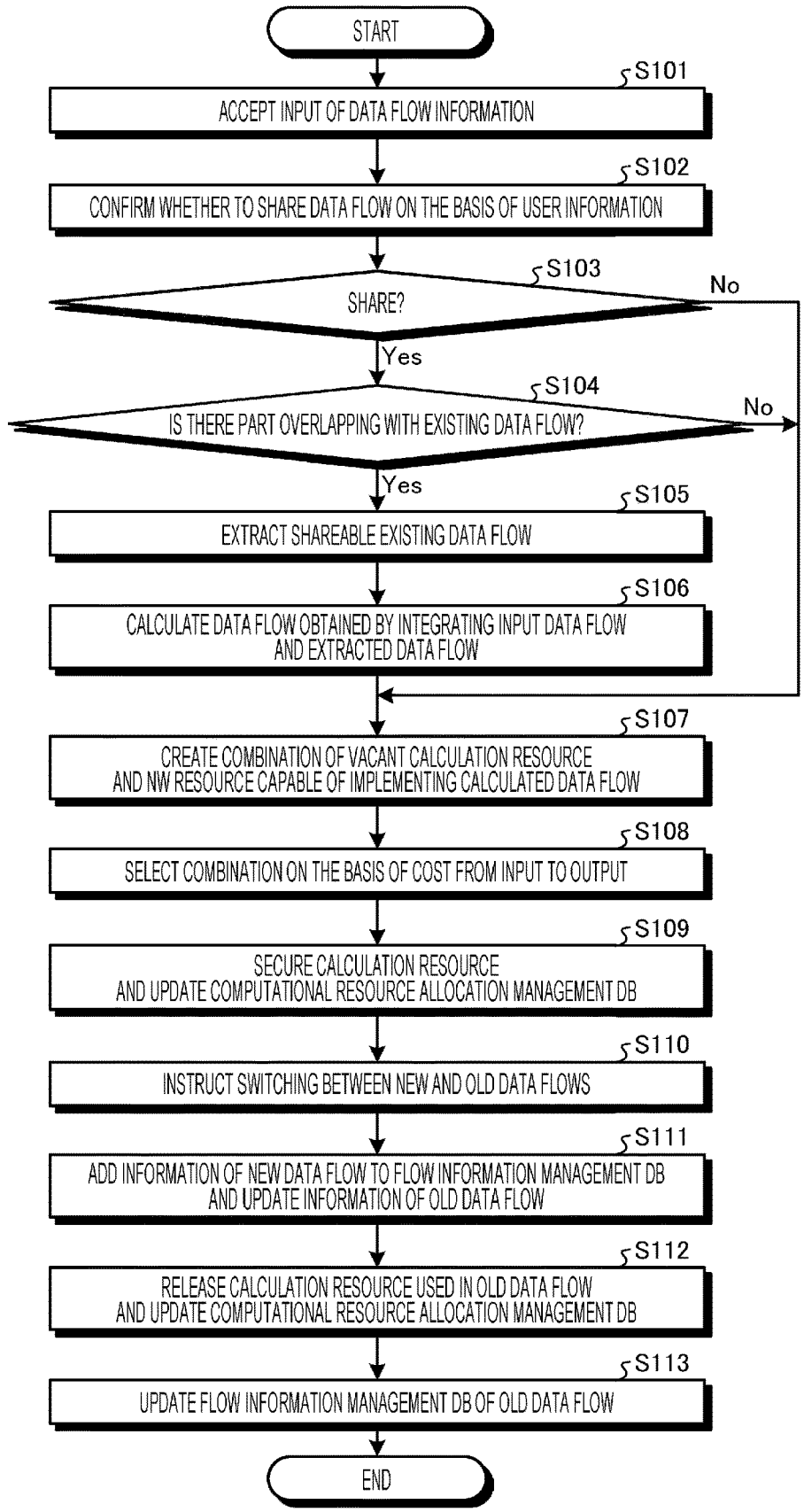
FIG. 4 is a flowchart illustrating a flow of processing of the data flow control device according to the first embodiment.

[Processing of first embodiment] FIG. 4 is a flowchart illustrating a flow of processing of the data flow control device according to the first embodiment. First, the data flow control device 10 accepts input of data flow information (step S101).

Next, the data flow control device 10 confirms whether to share the data flow on the basis of user information (step S102). If the data flow is not shared (step S103, No), the data flow control device 10 proceeds to step S107. On the other hand, if the data flow is shared (step S103, Yes), the data flow control device 10 proceeds to step S104.

Subsequently, the data flow control device 10 determines whether or not the input data flow has a part overlapping with the existing data flow (step S104). If the input data flow does not have a part overlapping with the existing data flow (step S104, No), the data flow control device 10 proceeds to step S107. On the other hand, if the input data flow has a part overlapping with the existing data flow (step S104, Yes), the data flow control device 10 proceeds to step S105.

The data flow control device 10 extracts a shareable existing data flow (step S105). Then, the data flow control device 10 calculates a data flow obtained by integrating the input data flow and the extracted data flow (step S106).

The data flow control device 10 creates a combination of a vacant calculation resource and a network (NW) resource capable of implementing the calculated data flow (step S107). Then, the data flow control device 10 selects a combination on the basis of the cost from the input to the output (step S108).

Here, the data flow control device 10 secures a calculation resource and updates the computational resource allocation management DB 122 (step S109). Then, the data flow control device 10 instructs the data processing system 20 to switch between new and old data flows (step S110).

Moreover, the data flow control device 10 adds information of a new data flow to the flow information management DB 121 and updates information of the old data flow (step S111). Furthermore, the data flow control device 10 releases the calculation resource used in the old data flow and updates the computational resource allocation management DB 122 (step S112). Then, the data flow control device 10 updates the flow information management DB 121 of the old data flow (step S113).

[Effects of first embodiment] As described above, the data flow control device 10 calculates, from among data flows obtained by commonizing and integrating a part of the first data flow in operation in the system that processes data and the input second data flow, the third data flow in which a resource use amount when operated in the system satisfies a predetermined condition. The data flow control device 10 instructs the system to switch the first data flow to the third data flow. As described above, the data flow control device 10 not only commonizes a part of the new and old data flows, but also performs switching in consideration of the resource status of the system. As a result, according to the present embodiment, the data flow can be made efficient in the entire system. Moreover, according to the present embodiment, it is possible to replace the pluggable processing of the data flow.

The data flow control device 10 stores the result of first processing common to the first data flow and the second data flow in a queue, and calculates the third data flow in which second processing using the result of the first processing in the second data flow acquires data from the queue. As a result, according to the present embodiment, the processing efficiency of the entire system can be improved.

The data flow control device 10 confirms whether or not commonization of the first data flow is permitted on the basis of attribute information set in advance for the user of the first data flow. When the confirmation unit 131 confirms that commonization of the first data flow is permitted, the data flow control device 10 calculates the third data flow. There is a multi-tenant system in which the data output destination is a plurality of users. With such a system, there may be a case where commonization of a data flow is not permitted depending on the user attribute. In the present embodiment, it is possible to improve the efficiency of processing of the entire system in consideration of multi-tenancy.

[System configuration and other] Moreover, each component of each illustrated device is functionally conceptual, and does not necessarily need to be physically configured as illustrated. That is, a specific form of distribution and integration of devices is not limited to the illustrated form, and all or a part thereof can be functionally or physically distributed or integrated in any unit according to various loads, usage conditions, and the like. Furthermore, the entire or any part of each processing function performed in each device can be implemented by a central processing unit (CPU) and a program analyzed and executed by the CPU, or can be implemented as hardware by wired logic. The program may be executed not only by the CPU but also by another processor such as a GPU.

Moreover, among the processes described in the present embodiment, all or some of the processes described as being automatically performed can be manually performed, or all or some of the processes described as being manually performed can be automatically performed by a known method. In addition, the processing procedure, the control procedure, the specific name, and information including various data and parameters illustrated in the above document or the drawings can be arbitrarily changed unless otherwise specified.

[Program] As an embodiment, the data flow control device 10 can be implemented by installing a data flow control program for executing the data flow control processing mentioned above as package software or online software in a desired computer. For example, by causing an information processing device to execute the data flow control program described above, the information processing device can be caused to function as the data flow control device 10. The information processing device mentioned here includes a desktop or notebook personal computer. Moreover, the information processing device includes mobile communication terminals such as a smartphone, a mobile phone, and a personal handyphone system (PHS), and further includes slate terminals such as a personal digital assistant (PDA).

Moreover, the data flow control device 10 can also be implemented as a data flow control server device that uses a terminal device used by a user as a client and provides a service related to the data flow control processing described above to the client. For example, the data flow control server device is implemented as a server device that provides a data flow control service having a data flow as an input and a data flow change instruction as an output. In this case, the data flow control server device may be implemented as a web server, or may be implemented as a cloud that provides a service related to the data flow control processing mentioned above by outsourcing.

Figure 5:
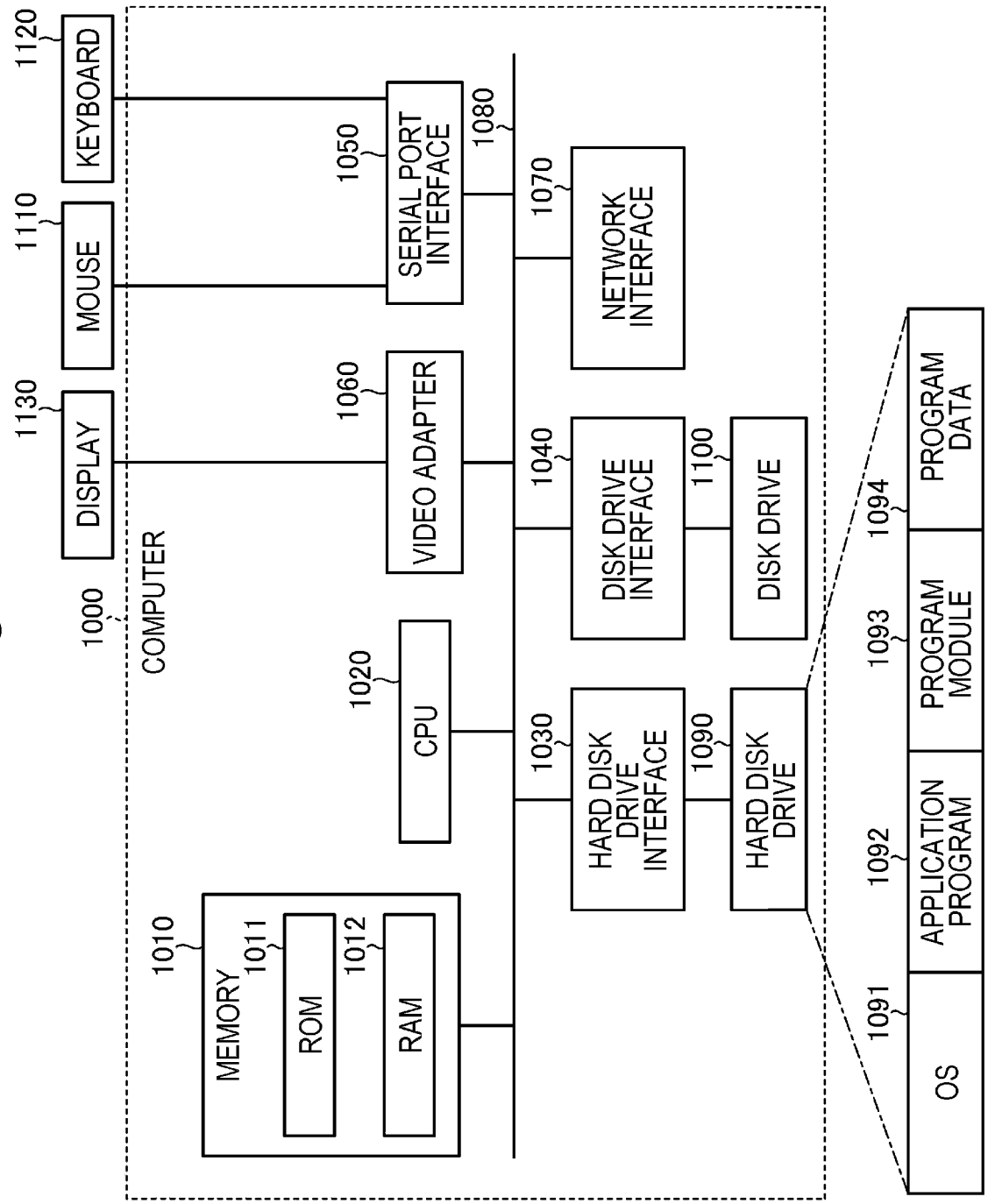
FIG. 5 is a diagram illustrating an example of a computer that executes a data flow control program.

FIG. 5 is a diagram illustrating an example of a computer that executes a data flow control program. A computer 1000 has, for example, a memory 1010 and a CPU 1020. Moreover, the computer 1000 also includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected with a disk drive 1100. For example, a removable storage medium such as a magnetic disk or an optical disk is inserted into the disk drive 1100. The serial port interface 1050 is connected with, for example, a mouse 1110 and a keyboard 1120. The video adapter 1060 is connected with, for example, a display 1130.

The hard disk drive 1090 stores, for example, an OS 1091, an application program 1092, a program module 1093, and program data 1094. That is, the program that defines each processing of the data flow control device 10 is implemented as the program module 1093 in which a code executable by the computer is described. The program module 1093 is stored in, for example, the hard disk drive 1090. For example, the program module 1093 for executing processing similar to the functional configurations in the data flow control device 10 is stored in the hard disk drive 1090. Note that the hard disk drive 1090 may be replaced with a solid state drive (SSD).

Moreover, the setting data used in the processing of the above-described embodiment is stored in, for example, the memory 1010 or the hard disk drive 1090 as the program data 1094. Then, the CPU 1020 reads the program module 1093 and the program data 1094 stored in the memory 1010 and the hard disk drive 1090 to the RAM 1012 as necessary, and executes the processing of the above-described embodiment.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from the other computer via the network interface 1070.

REFERENCE SIGNS LIST

10 Data flow control device
11 Interface unit
12 Storage unit
13 Control unit
20 Data processing system
121 Flow information management DB
122 Computational resource allocation management DB
123 Line information DB
131 Confirmation unit
132 Extraction unit
133 Calculation unit
134 Instruction unit
135 Update unit

The invention claimed is:

1. A data flow control device comprising
processing circuitry configured to:
calculate, from among data flows obtained by commonizing and integrating at least a part of a first data flow in operation in a system that processes data and an input second data flow, a third data flow in which a resource use amount when operated in the system satisfies a predetermined condition, wherein
the first data flow includes a first plurality of processing,
the second data flow includes a second plurality of processing,
the third data flow includes at least a processing of the first plurality of processing included in the first data flow,
the at least a processing of the first plurality of processing included in the first data flow is executed only once during execution of the third data flow,
the third data flow includes at least a processing of the second plurality of processing included in the second data flow, and
the at least a processing of a second plurality of processing included in the second data flow is executed only once during the execution of the third data flow;
instruct the system to switch the first data flow to the third data flow;
store, based on the calculated third data flow, a result of executing the first data flow in a queue;
acquire, by the second data flow, the result of executing the first data flow from the queue without executing the first data flow while executing at least a part of the second data flow; and
acquire, by the third data flow, the result of executing the first data flow from the queue without executing the first data flow while executing at least a part of the third data flow.

2. The data flow control device according to claim 1, wherein the processing circuitry is further configured to store a result of first processing common to the first data flow and the second data flow in a queue, and calculate the third data flow so that second processing using the result of the first processing in the second data flow acquires data from the queue.

3. The data flow control device according to claim 1, the processing circuitry is further configured to:
confirm whether or not commonization of the first data flow is permitted based on attribute information set in advance for a user of the first data flow; and
when confirming that commonization of the first data flow is permitted, calculate the third data flow.

4. A data flow control method executed by a data flow control device, the data flow control method comprising:
calculating, from among data flows obtained by commonizing and integrating at least a part of a first data flow in operation in a system that processes data and an input second data flow, a third data flow in which a resource use amount when operated in the system satisfies a predetermined condition, wherein
the first data flow includes a first plurality of processing,
the second data flow includes a second plurality of processing,
the third data flow includes at least a processing of the first plurality of processing included in the first data flow,
the at least a processing of the first plurality of processing included in the first data flow is executed only once during execution of the third data flow,
the third data flow includes at least a processing of the second plurality of processing included in the second data flow, and
the at least a processing of a second plurality of processing included in the second data flow is executed only once during the execution of the third data flow;
instructing the system to switch the first data flow to the third data flow;
store, based on the calculated third data flow, a result of executing the first data flow in a queue;
acquire, by the second data flow, the result of executing the first data flow from the queue without executing the first data flow while executing at least a part of the second data flow; and
acquire, by the third data flow, the result of executing the first data flow from the queue without executing the first data flow while executing at least a part of the third data flow.

5. A non-transitory computer-readable recording medium storing therein a data flow control program that causes a computer to execute a process comprising:
calculating, from among data flows obtained by commonizing and integrating at least a part of a first data flow in operation in a system that processes data and an input second data flow, a third data flow in which a resource use amount when operated in the system satisfies a predetermined condition, wherein
the first data flow includes a first plurality of processing,
the second data flow includes a second plurality of processing,
the third data flow includes at least a processing of the first plurality of processing included in the first data flow,
the at least a processing of the first plurality of processing included in the first data flow is executed only once during execution of the third data flow,
the third data flow includes at least a processing of the second plurality of processing included in the second data flow, and
the at least a processing of a second plurality of processing included in the second data flow is executed only once during the execution of the third data flow;
instructing the system to switch the first data flow to the third data flow; and
store, based on the calculated third data flow, a result of executing the first data flow in a queue;
acquire, by the second data flow, the result of executing the first data flow from the queue without executing the first data flow while executing at least a part of the second data flow; and
acquire, by the third data flow, the result of executing the first data flow from the queue without executing the first data flow while executing at least a part of the third data flow.

6. The data flow control device according to claim 1, the processing circuitry further configured to:
retrieve the first data flow and the second data flow,
wherein the first data flow represents a first operation executed in a data processing system,
the first data flow comprises a plurality of steps of the first operation,
the second data flow represents a new data flow for executing a second operation in the data processing system,
the first operation is distinct from the second operation,
the third data flow comprises the plurality of steps of the first data flow for executing the first operation,
the third data flow comprises one or more steps of the plurality of steps, the one or more steps are at least a part of steps of the second data flow for executing the second operation,
the third data flow indicates the resource use amount satisfying the predetermined condition, and
the instruct operation further comprises instructing the data processing system to switch from using the first data flow to using the third data flow for executing the first operation.

7. The data flow control method according to claim 4, further comprising:
retrieving the first data flow and the second data flow,
wherein the first data flow represents a first operation executed in a data processing system,
the first data flow comprises a plurality of steps of the first operation,
the second data flow represents a new data flow for executing a second operation in the data processing system,
the first operation is distinct from the second operation,
the third data flow comprises the plurality of steps of the first data flow for executing the first operation,
the third data flow comprises one or more steps of the plurality of steps, the one or more steps are at least a part of steps of the second data flow for executing the second operation,
the third data flow indicates the resource use amount satisfying the predetermined condition, and
the instruct operation further comprises instructing the data processing system to switch from using the first data flow to using the third data flow for executing the first operation.

* * * * *